United States Patent [19]

Babcock et al.

[11] Patent Number: 4,746,365
[45] Date of Patent: May 24, 1988

[54] UTILIZATION OF LATEXES WITH HYDRAULIC CEMENT AND GYPSUM COMPOSITIONS

[75] Inventors: Warner K. Babcock, Stamford; David A. Ruefenacht, New Canaan, both of Conn.

[73] Assignee: Construction Products Research, Inc., Fairfield, Conn.

[21] Appl. No.: 14,169

[22] Filed: Feb. 2, 1987

Related U.S. Application Data

[63] Continuation-in-part of Ser. No. 702,541, Feb. 19, 1985, abandoned.

[51] Int. Cl.[4] .................. C04B 7/32; C04B 24/34
[52] U.S. Cl. ........................... 106/104; 106/90; 106/94
[58] Field of Search ............... 106/90, 94, 104

[56] References Cited

U.S. PATENT DOCUMENTS

| | | | |
|---|---|---|---|
| 3,822,229 | 7/1974 | McMaster | 260/29.6 S |
| 3,826,665 | 7/1974 | Hovasse et al. | 106/104 |
| 3,866,383 | 2/1975 | Bernett | 52/744 |
| 3,895,018 | 7/1975 | Adolf | 260/29.7 S |
| 3,895,953 | 7/1975 | Mehta | 106/88 |
| 3,917,771 | 11/1975 | Basile | 264/35 |
| 3,923,717 | 12/1975 | Lalk et al. | 260/29.6 S |
| 4,039,345 | 8/1977 | Emig et al. | 106/90 |
| 4,042,407 | 8/1977 | Natsuume | 106/90 |
| 4,045,237 | 8/1977 | Gaines et al. | 106/89 |
| 4,047,967 | 9/1977 | Majidzadeh et al. | 106/90 |
| 4,057,528 | 11/1977 | Hunt | 260/29.7 S |
| 4,060,425 | 11/1977 | Harada et al. | 106/94 |
| 4,088,804 | 5/1978 | Cornwell et al. | 428/220 |
| 4,151,150 | 4/1979 | Peters et al. | 260/29.7 S |
| 4,157,263 | 6/1979 | Gaines et al. | 106/89 |
| 4,193,816 | 3/1980 | Ferm et al. | 106/277 |
| 4,229,224 | 10/1980 | Dawson et al. | 106/90 |
| 4,238,239 | 12/1980 | Brown | 106/116 |
| 4,240,952 | 12/1980 | Hulbert et al. | 260/42.13 |
| 4,249,950 | 2/1981 | Hurst | 106/90 |
| 4,255,398 | 3/1981 | Tanaka et al. | 423/117 |
| 4,294,622 | 10/1981 | Brown | 106/314 |
| 4,351,750 | 9/1982 | Ferm et al. | 524/8 |
| 4,352,696 | 10/1982 | Langdon | 106/104 |
| 4,357,166 | 11/1982 | Babcock | 106/89 |
| 4,396,723 | 8/1983 | Temple et al. | 501/80 |
| 4,494,990 | 1/1985 | Harris | 106/90 |

FOREIGN PATENT DOCUMENTS

| | | |
|---|---|---|
| 2237858 | 7/1974 | France . |
| 2348898 | 4/1976 | France . |
| 1335427 | 10/1973 | United Kingdom . |
| 1357391 | 6/1974 | United Kingdom . |
| 1489947 | 10/1977 | United Kingdom . |

OTHER PUBLICATIONS

Wagner, "Polymer Modification of Portland Cement Systems," *CHEMTECH*, 2/73, pp. 105–108.
Eash et al., "Reactions of Polymer Latexes with Portland Cement Concrete".
Isenburg et al., "A Hypothesis for the Reinforcement of Portland Cement by Latex," pp. 1197–1202.
Whiting et al., "Epoxy Impregnation of Portland Cement Concrete," pp. 1154–1156.
Pike et al., "Polymer Resins as Admixtures in Portland Cement Mortar and Concrete," (Abstract), 9/25/73.
Dierkes et al., "Effect of Synthetic Macromolecular Additives on the Formation of Hydration Products of Portland Cement and Gypsum" (Abstract No. 84:64543w), 1976.
Cherkinskii et al., "Chemical Stability of Latex-Cement Compositions," (Abstrtact 144244c), 1975.
Okorokov et al., "Use of Polymers as Additives to Hydraulic Concrete" (Abstract 74035e), 1975.
Kravchenko et al., "Composition for Floor Coatings" (Abstract 175235e), 1974.
Zhangabylov et al., "Coagulation of Divinylstyrene Latex in Suspensions of Portland Cement . . . ," (Abstract 117559v), 1972.
Okorokov et al., "Crack Resistance of Hydraulic Concrete by Addition of Polymeric Additives" (Abstract 24245z), 1972.

*Primary Examiner*—Steven Capella
*Attorney, Agent, or Firm*—Pennie & Edmonds

[57] ABSTRACT

This invention relates to improved aluminous cement/gypsum compositions that contain polymer latex emulsions or compounds to produce self-curing, crack-free, fast-setting, high early strength, high bonding, water resistant, durable, cementitious mixtures for finishing, coating, plastering, stucco, rigid insulation protection, topping, resurfacing, patching, motaring, tile grouting, concrete, and the like. In addition, this invention discloses a method for improving the properties and performance of aluminous cement/gypsum compositions by adding certain types, amounts and/or combinations of polymer latex emulsions or compounds with or without the addition of wet expansion and drying shrinkage inhibitors.

35 Claims, No Drawings

UTILIZATION OF LATEXES WITH HYDRAULIC CEMENT AND GYPSUM COMPOSITIONS

This application is a continuation-in-part of appplication Ser. No. 702,541, filed Feb. 19, 1985 now abandoned.

FIELD OF THE INVENTION

This invention relates to methods and compositions for improving the performance of aluminous cement/gypsum compositions by adding specific polymer latex emulsions with or without the addition of other wet expansion and drying shrinkage inhibitors.

Definitions

The term "hydraulic cement" as used herein is intended to mean Portland cements, expansive cements, air entraining Portland cements, pozzolanic cements, slag cement, masonry cement, white Portland cement, colored cement, antibacterial cement, waterproof cement, a mixture of Portland cement and blast furnace cement, refractory cement, self-stressing cement, aluminous cement, and similar materials.

The term "gypsum" such as is normally understood in the art. This would include calcium sulfate ($CaSO_4$) and its various forms such as calcium sulfate anhydrate, calcium sulfate hemihydrate, and calcium sulfate dihydrate, as well as calcined gypsum, pressure calcined gypsum, and plaster of Paris.

The term "cementitious mixtures" as used herein is intended to mean the combination of hydraulic cement and gypsum in any ratio. These compositions generally possess the characteristic of hardening under water, and include cementitious water-proofings, toppings, protective coatings, and the like as well as mixtures that include aggregates and water such as concrete, mortar, grout, and products made therefrom.

The term "aluminous cement" as used herein is intended to include those cementitious materials normally understood in the art to contain as the main cementitious constituent, mono calcium aluminate ($CaO \times Al_2O_3$). This would include high alumina cement (HAC), calcium aluminate cement, and many other commercially available alumina cements. High alumina cement is normally understood in the art to contain greater than 15% of mon calcium aluminate.

The term "Portland cement" as used herein is intended to include those cements normally understood in the art to be "Portland cement," such as those described in ASTM Standard C-150. The Type 1 and Type 3 compositions of that standard are especially preferred for use in the present invention, although other forms of Portland cement are also suitable. The Portland cement component of these cementitious mixtures acts to reduce drying shrinkage and increase wet expansion. Other cements which act as drying shrinkage inhibitors, although not specifically referred to as Portland cement, are also suitable for use herein so that the term "Portland Cement" should be understood as encompassing those other cements. Examples of drying shrinkage inhibitors include expansion promoters such as expansive cements which are compatible with the other constituents of the system.

The term "drying shrinkage" as used herein is intended to mean contraction of a cementitious mixture in the hardened state, that is, after the final set. The term "drying shrinkage inhibitor" as used herein may include mechanical restraining or reinforcing devices or chemical compounds which may include, but are not limited to, certain latex compounds, water retentivity aids, lime, expansive agents, aluminum sulfate, combinations of cements, fibers, reinforcement, or such devices which reduce or eliminate drying shrinkage.

The term "drying shrinkage inhibitor" may also be used herein to describe components or materials which cause an expansion of the cementitious mixture in the hardened state.

The term "wet expansion" as used herein is intended to mean expansion of a cementitious mixture in the hardened state, that is, after the final set, in moist conditions as determined generally in accordance with ASTM Standard C-157, a test method for length change of hardened cement, mortar, and concrete.

The term "wet expansion inhibition" and "wet expansion counteraction" are used essentially interchangeably herein to describe, as a minimum, a reduction in the wet expansion of the cementitious mixture in the hardened state and/or advantageously maintaining a volume equal to or greater than a system placement volume, and encompass other similar terms such as "wet expansion elimination."

The term "wet expansion inhibitors" encompasses certain latexes and/or lithium salts and other such chemical or physical compounds including mechanical devices, restraining or reinforcing devices which limit the wet expansion.

"Polymer latex emulsions and compounds" as used herein are intended to include those latex emulsions and compounds normally understood in the art to be styrene butadiene, styrene acrylate, acrylic, PVA, and other latex emulsions, compounds and powders.

BACKGROUND OF THE INVENTION

Hydraulic cement, particularly Portland cement, is commonly used throughout construction in many applications. Recent developments in polymer latex technology have provided compatible polymer emulsions and compounds for use in conjunction with these hydraulic cements alone for improvement of properties such as bond strength, tensile strength, and flexural strength.

There have been numerous prior attempts at providing cementitious systems to meet the needs of the construction industry, particularly in the protection, waterproofing, and repair of concrete structures. The optimum system should set within a relatively short period of time into a hard mass or coating that has sufficient strength, abrasion resistance, and corrosion resistance. It is also highly desirable that these systems possess impermeability to fluids, particularly aqueous solutions. Also, such systems should not undergo excessive hardened volume changes under either wet or dry conditions.

For commercial use, these types of cementitious systems must also possess good bonding characteristics to damp or dry surfaces, early as well as long term strength, and practical field workability. They should be capable of withstanding freezing and thawing, as well as the action of salts, solvents and other corrosive substances. Although there have been a number of cementitious mixtures that possess one or more of the above-described desirable properties, none of the prior art to date has been able to achieve all of the foregoing in one composition and previous attempts have only had limited success. U.S. Pat. No. 4,357,166 discusses some of the limitations of these prior art compositions in columns 2 and 3, and is expressly incorporated herein by reference.

It has been well known that cementitious mixtures in general and Portland/gypsum mixtures in particular demonstrate poor durability, weatherability, freeze/thaw resistance, poor resistance to water and salt penetration, erosion, and long term dimensional stability when wet, as well as exhibit poor bonding performance. In addition, varying shrinkage and expansive results can occur due to variations of tricalcium aluminate and other compounds in the Portland cement. Moreover, previous attempts to control volume change as well as to produce a durable, permanent, high bonding, moisture resistant, freeze/thaw resistant, crack-free, and sound cementitious mixture have resulted in limited or no success. In addition, these Portland/gypsum compositions demonstrate higher porosity and absorption rates than equivalent Portland cement mixtures alone, thereby jeopardizing not only the resistance of the material to corrosive water or salts, but also to freeze/thaw cycling. The Portland/gypsum mixture's, performance as patching, topping, and resurfacing materials to protect concrete from the action of salts has also been poor. It is well known that gypsum materials alone or in combination with Portland cements do not have the water resistance nor the resistance to weathering or long term durability under wet/dry cycling.

In addition, it has been noted that production Portland cements vary in both fineness and composition so that Portland/gypsum mixtures vary significantly in both set time, water demand, and consistency, thus resulting in variable field performance and mixing requirements as well as unpredictable early strengths. Constant plant adjustments and variations in formulations and appropriate admixtures to be undertaken to provide the product with reasonably reliable performance.

Previous compositions containing other hydraulic cements such as aluminous cement and gypsum have been shown to exhibit long term wet expansion. For example, U.S. Pat. No. 4,357,166 discloses a cementitious composition which when mixed with water is capable of setting rapidly to a hard mass of high compressive strength without substantial shrinkage during setting and which exhibits reduced wet and dry volume changes in the hardened state. That invention also possesses a degree of impermeability to fluids along with abrasion, erosion, and chemical resistance, as well as other characteristics which are desirable in a composition having commercial usefulness in the construction industry. The advantages of that invention are achieved by a cementitious composition comprising a mixture of an aluminous cement, a gypsum, a drying shrinkage inhibitor, and a wet expansion inhibitor. The compositions of that invention preferably use Portland cement as a drying shrinkage inhibitor and a lithium salt as the wet expansion inhibitor. However, various accelerators, retarders and other admixtures, when added to aluminous cement and gypsum compositions, can significantly affect the hardened volume change (wet or dry), thus limiting their usefulness.

Additionally, previous attempts to blend gypsum with other hydraulic cements, while producing the desired effect such as fast-setting or reduced shrinkage, have also affected the soundness, durability, workability, resistance to water or wet/dry cycling stability or permanency of the resulting cement.

The addition of latex emulsions or compounds to Portland cements alone has been well known and used to improve bond strength, tensile strength, absorption rates, and the like. In addition, latex emulsion compounds more recently have disclosed for use in expansive cements utilizing mechanical restraining devices such as reinforcement of restraining elements to control or reduce volume changes. However, the stresses created by these may still cause cracking, curling or debonding from weak surfaces such as foam glass. In addition, they require careful design, mapping, spacing or dispersion to provide uniformly effective reinforcement. (See, e.g., U.S. Pat. No. 4,039,345). Also, formulations of expansive cements that have utilized latexes produce an initial wet or dry expansion without eliminating the problem of eventual drying shrinkage of similar magnitude of an equivalent ordinary cement drying out unrestrained with or without the use of latex emulsions and compounds.

It is also known that polymer latex emulsions can be utilized with Portland cement mortars to increase their tensile strengths and resistance to water penetration. One would expect, however, that the addition of a polymer latex emulsion to a HAC/gypsum composition would hinder or inhibit wet expansion because, theoretically, the latex should prevent water from entering the mix, thus limiting the amount of additional water needed to cause wet expansion through the formation of ettringite. In addition, by increasing the tensile strength of the hardened HAC/gypsum composition, one would expect that the polymer latex compound would reduce any tendency of the composition to expand by creating an internal restrained effect.

In addition, latex has been added to gypsum mixtures for use as drywall joint compounds, as shown in U.S. Pat. No. 4,294,622. Also, U.S. Pat. No. 4,088,804 shows that latex has been added to Portland cement or high alumina cement as a protective or decorative coating, about 2 mils or greater thickness with finely divided mineral aggregates, water reducers and rust inhibitors. High alumina cement, lithium, and latex combinations have also been noted in U.S. Pat. No. 4,352,693.

Traditionally, cement-based stucco materials and protective coatings for rigid insulation systems have required the use of metal lath, fiber, and mesh to reduce or control cracking due to shrinkage in cementitious mixtures.

It is well known that the addition of latex to Portland cement and other sand hydraulic cements improves bonding performance and increases the tensile and flexural strength. However, the addition of latexes to such cements alone does not specifically reduce ultimate drying shrinkage, and in certain instances increases drying shrinkage except when latex solids are merely used to reduce the water/cement ratio by substituting polymer solids for water. Furthermore, certain latex emulsions in combination with one or more cements can cause unsoundness, excessive expansion, nonuniform surface finishes, retarded set time and/or poor workability and finishing properties.

Previous applications of cementitious compositions to porous, absorptive concrete and masonry type surfaces have required surface wet down or substrate saturation prior to the application of the cementitious coating in order to retard or eliminate the tendency of the absorptive substrate from absorbing water from the freshly applied cementitious coating. The rapid loss of mixing water from the freshly placed cementitious coating due to this absorptive nature of the substrate leads to a number of undesirable and detrimental effects, such as rapid loss of workability, plastic shrinkage cracking, lower strengths, poorer bonding, softness of the cured coating, and many other properties of hydraulic cements which are dependent upon the presence of curing water for proper development, i.e., permeability and the like.

In addition, the application of cementitious coatings and numerous other concrete type products, such as patching, topping, resurfacing, and the like, require the application of a curing compound or moist curing process which may involve numerous repeated steps of fogging or the application of and protection with wet burlap and the like in order to reduce plastic shrinkage cracking and the rate of drying shrinkage as well as providing proper amounts of moisture in order for the hydraulic cement to properly hydrate and increase in strength and other such related properties.

Under a number of field conditions, such as hot or windy weather, it can become very costly, if not impossible, to keep absorptive surfaces dampened or saturated in order to obtain proper material performance in the field. In addition, any deep in-ground structures, as well as high rise structural faces which are not easily accessible, cannot easily or practically protected from premature drying due to excessive evaporation after application.

These problems become particularly evident when workers are highly dependent upon scaffolding and other such remote work platforms. Furthermore, reliability of material that requires thorough saturation of the substrate and moist curing after application becomes highly dependent upon the timing, thoroughness and experience of workmen.

SUMMARY OF THE INVENTION

This invention is directed to a method and composition for improving the performance of aluminous cements/gypsum cementatious mixtures by adding polymer latex emulsions to produce self-curing, crack-free, fast-setting, high early strength, high bonding, improved cementitious mixtures for finishing, coating, plastering, stucco, rigid insulation protection, topping, resurfacing, patching, mortaring, tile grouting, concrete and the like. These emulsions may be added with or without the addition of drying shrinkage or wet expansion inhibitors to achieve fastsetting, self-curing mixtures with improved resistance to moisture, greater durability and soundness, better freeze/thaw resistance, improved resistance to erosion, improved resistance to chemical or salt penetration, and superior length change stability.

This invention also relates to improving such mixtures in such a way that the moisture and water resistance, as well as moisture protection, exceeds that of other ordinary cements.

This invention relates to improving such compositions with the addition of polymer latex emulsions to produce a buffering effect of wide variations on both workability, set time and property development and performance, thus significantly reducing the need for adjustments in the formulation during production.

This invention also relates to controlling aluminous cement compositions with combinations of gypsum and latex emulsions and compounds with or without wet expansion and drying shrinkage inhibitors to produce the desired wet or dry state or long term volume and length change to be useful for the intended application. Under certain applications where hardened dry or wet expansion is required or minimal wet expansion is desired, this invention provides a range of performance with long term durability and adequate strength for a wide range of construction product uses.

This invention further relates to methods and compositions for controlling and improving such cementitious mixtures to reduce or eliminate the need for metal lath, fiber, mesh or other reinforcement systems.

It has also been discovered that various latex emulsions and compounds, along with their non-ionic and anionic surfactants, foam depressants, and other additives have unexpected, unique effects on aluminous cement/gypsum compositions, particularly relating to behavior of cementitous mixtures under wet and dry conditions relating to its hardened length change.

This invention relates to compositions which do not require surface wetting, substrate saturation, or moist curing to obtain desired properties for cementitious mixtures for finishing, coating, plastering, topping, resurfacing, patching, mortaring, tile grouting, concrete, and the like.

Specifically, the invention relates to a method for reducing the wet expansion and drying shrinkage of an aluminous cement which comprises adding thereto gypsum in an amount of about 5 to 55 percent by weight based on the amount of aluminous cement to reduce drying shrinkage and a first polymer latex emulsion such that the percent polymer solids based on the amount of aluminous cement and gypsum is about 1 to 25 percent by weight to reduce wet expansion.

Preferably, the amount of gypsum ranges from about 5 to 40 percent, and most preferably from 10 to 25 percent. Also, the amount of solids of the first polymer latex emulsion ranges from about 2 to 15 weight percent, most preferably 5 to 10 weight percent.

This method can also include adding a second polymer latex emulsion such that the percent polymer solids based on the amount of aluminous cement and gypsum is about 1 to 25 percent by weight to further reduce drying shrinkage. Preferably, the amount of solids of the second polymer latex ranges from about 2 to 15 weight percent.

The invention also relates to a method for reducing the drying shrinkage of an aluminous cement which comprises adding thereto gypsum in an amount of about 5 to 55 percent by weight based on the amount of aluminous cement and a polymer latex emulsion such that the percent polymer solids based on the amount of aluminous cement and gypsum is about 1 to 25 percent by weight to reduce drying shrinkage. The preferred amounts of gypsum and polymer solids are as discussed hereinabove.

This method can also include adding a second polymer latex emulsion such that the percent polymer solids based on the amount of aluminous cement and gypsum is about 1 to 25 percent by weight to reduce wet expansion. Preferably, the amount of solids in the second polymer latex ranges from about 2 to 15 and most preferably 5 to 10 weight percent.

The invention also contemplates a method for reducing the wet expansion of a cementitious composition comprising aluminous cement in an amount of 60 to 95 weight percent and gypsum in an amount of 5 to 40 weight percent, which method comprises adding thereto a first polymer latex such that the percent polymer solids based on the amount of aluminous cement and gypsum in the cementitious composition is about 1 to 25 weight percent to inhibit wet expansion.

This method can include adding a lithium salt in an amount of about 0.01 to 0.5 weight percent based on the weight of the cementitious composition to further reduce wet expansion, and advantageous lithium salts are lithium carbonate, lithium citrate, lithium hydroxide, lithium acetate, or mixtures thereof.

To reduce drying shrinkage, either Portland cement in an amount of about 0.1 to 25 percent by weight based on the weight of the cementitious composition, aluminum sulfate in an amount of about 0.1 to 15 percent by weight based on the weight of the cementitious composition, or a second polymer latex emulsion such that the percent polymer solids based on the amount of the aluminous cement and gypsum is about 1 to 25 percent by weight can be added.

The invention also includes a method for reducing the drying shrinkage of a cementitious composition comprising aluminous cement in an amount of about 60 to 95 weight percent and gypsum in an amount of about 5 to 40 weight percent, which method comprises adding a first polymer latex such that the percent polymer solids based on the amount of aluminous cement and gypsum in the cementitious composition is about 1 to 25 weight percent to reduce the drying shrinkage.

As above, the same additional drying shrinkage inhibitors can be used. Also, if desired, the previously described wet expansion inhibitors can be added.

Finally, the invention also relates to the compositions produced by the above-described methods.

DESCRIPTION OF THE PREFERRED EMBODIMENTS

Applicants have discovered cementitious compositions which when mixed with water are capable of setting rapidly into a hard mass of high compressive strength without substantial shrinkage during setting and which exhibit reduced wet and dry volume changes in the hardened state. These compositions also possess a high degree of impermeability to fluids and a higher bond strength. These improvements are achieved, according to this invention, by the use of a lithium salt to control expansion in a cementitious composition which is comprised of a mixture of an alumina cement, a gypsum, and a polymer latex emulsion. A particular cementitious composition comprises alumina cement, gypsum, Portland cement as a drying shrinkage inhibitor, one or more of a polymer latex emulsion, and a lithium salt in an amount effective to act as a wet expansion inhibitor.

Thus, one object of this invention is the provision of a cementitious composition which, when mixed with water, sets in a relatively short period of time to a hard mass without excessive wet or dry hardened volume changes. A further object of this invention is the provision of a method for inhibiting hardened volume changes in cementitious compositions containing an aluminous cement, a gypsum, a polymer latex emulsion, a drying shrinkage inhibitor, and a wet expansion inhibitor. The wet expansion is inhibited by the addition of a lithium salt in an effective amount ranging between 0.01 to 0.5 weight percent based on the alumina cement and gypsum, and preferably between 0.1 and 0.3 weight percent.

It is preferable to employ between about 60 and 95, preferably 75 to 90 by weight percent aluminous cement and between about 5 and 40, preferably 10 and 25 weight percent gypsum. The drying shrinkage inhibitor, Portland cement, is added in an amount ranging from 0.1 and 25 weight percent based on the aluminous cement and gypsum, and preferably between 1 and 20 weight percent. The polymer latex emulsion is added in an amount ranging between 1 and 25 and preferably between about 5 and 10 weight percent based upon the amount aluminous cement and gypsum.

Examples of gypsums which are suitable for use in the present invention can be found in U.S. Pat. No. 4,357,166, the content of which is expressly incorporated herein by reference.

Examples of polymer latex emulsions which are suitable for use in the present invention include methyl cellulose, hydroxyethyl cellulose, polyvinyl alcohol, styrene, divinyl styrene, methyl methacrylate, copolymers of styrene and methyl methacrylate or maleic anhydride, acrylic and acrylic ester resins, emulsions of vinyl acetate homopolymer, vinyl acetate-acrylic copolymer, internally plasticized and externally plasticized vinyl chloride copolymers, polyacrylic emulsions, styrene-butadiene copolymers, vinyl chloride-vinylidene chloride copolymers, vinyl chloride-vinylidene chloride-acrylic terpolymers, copolymers of methyl methacrylate with methacrylic acid, acrylic acid, crotonic acid, itaconic acid or similar unsaturated carboxylic acids; copolymers of methyl methacrylate with ethyl acrylate, 2 ethyl hexyl acrylate, butyl acrylate or similar esters of acrylic acid, together with acids of the above type; copolymers of vinyl acetate with esters of acrylic acid methacrylic acid crotonic acid or similar unsaturated acid, subsequently modified to produce carboxyl groups; copolymers of vinyl acetate with acrylic acid, methacrylic acid, crotonic acid and similar unsaturated acids or salts of these acids; copolymers of vinyl pyrrolidone with acrylic acid, methacrylic acid, crotonic acid or similar unsaturated acid, and which can also include as monomers esters of these acids; copolymers of anhydrides of unsaturated acids, such as maleic acid, with suitable unsaturated monomers such as styrene, di-isobutylene, methyl vinyl ether; partially hydrolysed polymers and copolymers of acrylamide, methacrylamide and acrylonitrile; graft copolymers of polyethylene oxide with copolymers of acrylic acid, methacrylic acid, etc., and methylacrylate, methyl methacrylate.

Other suitable polymers and specific examples of commercially available polymers are disclosed in U.S. Pat. No. 4,229,224, the content of which is expressly incorporated herein by reference.

The polymer latex emulsions used in the present invention are a colloidal dispersion of plastic particles in water. The particles are stabilized by a surface coating of anionic or nonionic surfactants which prevent or minimize agglomeration with the polyvalent ions that are normally found in cementitious mixtures as well as to prevent coagulation due to high shear forces when the concrete is mixed. Since these surfactants tend to "foam" when agitated, it is advantageous to incorporate antifoaming agents in the concrete to prevent excessive air entrapment.

Illustrative of non-ionic surfactants are, for example: fatty acids esters such as glycerol monostearate, diethyleneglycol laurate, propyleneglycol monostearate, sorbitol monolaurate, and pentacrythritol monostearate, acid derivatives of ethylene oxide products such as the reaction product of ethylene oxide and oleic acid; condensation products of ethylene oxide with alcohols such as steryl alcohol; and condensation products of ethylene oxide with phenols, naphthols, and alkyl phenols such as di-t-butylphenoxynonaoxy-ethylene-ethanol. Preferred are the condensation products of ethylene oxide with alkyl phenols.

Illustrative of anionic surfactants are, for example: the alkyl aryl sulfonates such as dodecylbenzene sodium sulfonate; sulfate derivatives of higher fatty alcohols (i.e., alcohols of at least nine carbon atoms and ordinarily not more than seventeen carbon atoms) such as sodium lauryl sulfate; the sulfonated animal and vegetable oils such as sulfonated fish and castor oils; sulfonated acyclic hydrocarbons; and the like. Advantageously the anionic surfactant component of the cement additive of the invention should be a sodium higher alkyl sulfate such as sodium lauryl sulfate and preferably would consist of a mixture of an alkyl aryl sulfonate surfactant and such sodium higher alkyl sulfate.

Each polymer produces a different effect in the resulting cementitious mixture but these polymers usually produce either of the following effects:

(1) control or reduction of wet expansion of the composition.

(2) control or reduction of the dry shrinkage of the composition.

The effect of the polymer in the particular cementitious mixture can be easily determined by one skilled in the art by routine experimentation. Then, upon determining the effect of the particular polymer in the composition, it can be added to produce the desired result.

For example, if the addition of latex emulsion to a Portland cement reduces the wet expansion but increases the drying shrinkage, then gypsum or a polymer latex which reduces wet expansion may be added to reduce the wet expansion of the composition. If the composition is to be used in a dry environment, the control of wet expansion by these additives becomes unnecessary.

As mentioned above, each polymer produces a different effect, and even polymers from the same chemical family may produce a different effect in the cement. It is believed that the different effects encountered are due to the different anionic or nonionic compounds that are used to form the polymer latex emulsion. However, since the effect of each polymer can be routinely determined, the exact nature of the cause of this effect does not appear to be of importance.

Also, as would be understandable to one skilled in the art, these polymers can be combined to achieve the desired results. For example, a polymer that reduces wet expansion can be comprised with one that reduces drying shrinkage to produce both effects in the composition.

Illustrative of anti-foaming agents are polyorgano siloxanes. These polyorganosiloxanes are the condensation products resulting from polymerization of organo silane diols, as represented by the formula

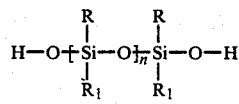

where R and $R_1$ in the above formula represent organic radicals such as alkyl, aryl, aralkyl and alkaryl or heterocyclic groups, and n is one or more. Also useful are polymerization products of organo silane diols in the presence of an organo silane monol, and condensation products obtained from mixtures of organo silane triols, diols, and monols.

Preferably the organo substituent of the siloxanes is lower alkyl (i.e., methyl, ethyl, propyl), cyclohexyl or phenyl. Most preferably it is methyl, and accordingly, the preferred polyorganosiloxanes are those which are condensation products of methyl silicols, and most preferably condensation products of dimethyl silane diol.

Polyorganosiloxanes are commercially available in several forms which are designated in the trade as "silicone fluids," "silicone emulsions" and "silicone compounds," the latter being siloxanes modified by the addition of a small percentage of finely divided silica or other inert divided solid. Any of these forms can be used in the practice of this invention.

In addition to the aforementioned essential constitutents of the cementitious composition of this invention, additional components such as viscosity controllers, surface active agents, retarders, accelerators, gas generating or gas releasing agents, fly ash, pumping aids, water retentivity aids, fillers, and aggregates may be utilized.

The aggregate employed in the present invention may be any conventionally employed manufactured aggregate or naturally occurring mineral aggregate, such as sand and a mixture or sand with gravel, crushed stone, or equivalent materials.

The cement compositions of the present invention are made by simply adding the additives to the cement with mixing to obtain a cement mix of desired flow and consistency.

While it is generally convenient to prepare the cement compositions of the invention as a unitary product by pre-combining the polymer latex emulsion, the nonionic and anionic surfactant, and polyorganosiloxane foam depressant, and then introducing the resulting mixture into the cementitious mixture. In making cement, mortar, or concrete mixes, it will be understood, of course, that it is not necessary that all the various components of the additive be so premixed. For example, equivalent cement, mortar, or concrete mixes are obtained by separate addition of the requisite quantity of polymer latex emulsion containing sufficient of the anionic and non-ionic surfactants to avoid coagulation of the latex, the polyorganosiloxane foam depressant and such additional non-ionic and anionic surfactants as are necessary. The resulting compositions are particularly effective for the preparation of cementitious compositions having inhibited wet expansion and which set in a relatively short period of time to form a hard mass of high compressive strength, high abrasion resistance, and high erosion and corrosion resistance, without substantial shrinkage during setting and without excessive dry hardened volume changes while possessing a high degree of impermeability to fluids, and a high bond strength to itself and other materials.

The addition of gypsum to hydraulic cement polymer modified mixes with or without wet expansion or drying shrinkage inhibitors can produce mixtures with a lower water/cement ratio, improved workability, plasticizing effect, fast-setting material, dimensionally stable materials, self-curing materials, high early strength cement mixes, and self-curing, volume stability materials with or without mechanical restraining or reinforcing devices. In addition, it has been found that certain latex emulsions unexpectedly increase the drying shrinkage of certain hydraulic cement/gypsum mixtures while other latex emulsions can unexpectedly cause dry expansion or excessive wet expansion with the same mixes.

Additionally, certain hydraulic/gypsum formulations which are regarded as volume stable behave unexpectedly in both the wet and dry state when mixed with certain latex emulsions to become useless unless otherwise controlled with wet expansion inhibitors and/or drying shrinkage inhibitors. Furthermore, very low absorption and low permeability cementitious mixtures have been invented by adding gypsum to certain hydraulic cements with a polymer modifier and mixes with water cement ratios as low as 20% while still maintaining workability.

In addition, cementitious mixtures utilizing this invention can be formulated to produce crack-free, low water permeability, self-curing, high bonding, long term durability, freeze/thaw resistant mixtures which are volume stable and can be used for, but are not limited to, plastering, finishing, tuck-pointing, tile grouting, topping, patching, crack repair, topping, resurfacing, sealing, weatherproofing, moisture protection, dampproofing and concrete which can be applied to concrete, masonry, brick, stone, rock and tile and the like with the required compatibility, breatheability, thermal coefficient of expansion, and volume stability to eliminate debonding, blistering, cracking, and reduce moisture penetration. In addition, this invention provides coatings and adhesives of such dimensional stability and compatability that they can be applied to foam glass without causing the coating to pit, break, or rip the surface of the foam glass due to excesive volume change.

Additional admixtures such as retarders, accelerators, surfactants, defoamers, water reducing agents, stearates, waterproofers, pigments, fillers, sands, aggregates, fly ash, fume silica, chemical and physical blowing agents, thixotropes, whiteners, and thickeners may also be added to either the dry cement mix or the emulsion or mixing water to produce the desired results.

EXAMPLES

The scope of the invention is further described in connection with the following examples which are set forth for purposes of illustration only and are not to be construed as limiting the scope of the inventon in any manner.

EXAMPLE NO. 1

A cement mixture of lumnite, a high alumina cement, gypsum and sand in a ratio of 40/10/50 were mixed with 83.3 ml of water. After one day, the dry cured bar expanded +11 and the wet cured bar expanded +846. Another cement mixture of the same composition was mixed with a combination of water and a BASF styrene acrylate latex emulsion. After one day, the dry cured bar expanded to +2610. This illustrates the significant and potentially detrimental amount of expansion effect a particular latex emulsion can have on certain hydraulic cement/gypsum compositions. Although the latex may improve certain properties in mixes such as bond strength, it is effectively useless due to the large volume changes.

EXAMPLE NO. 2

Using the same cement mixtures as described in Example No. 1, a lithium salt (lithium carbonate) in the amount of 0.07 g per 500 g cement mix was added. To this cement mix was added the same amounts of water and latex emulsion as described in Example No. 1. The one day dry cured bar expanded only +263. Another mix of the same composition was prepared except 0.1 g of lithium carbonate was added which resulted in a dry cure expansion in one day of +219. This illustrates the controlling effect lithium salt has on an otherwise unsound mixture.

EXAMPLE NO. 3

A cement composition of lumnite, gypsum and a drying shrinkage inhibitor, Portland cement, and a wet expansion inhibitor of a lithium salt (lithium carbonate) and sand were mixed in a ratio of 35/7.5/7.5/0.067/50. This mixture was mixed with the BASF styrene acrylate latex emulsion and water in the same proportions as in the example above. In one day the wet expansion was controlled to only +92 and the dry cured bar expanded only +92 and the dry cured bar expanded only +68. This demonstrates that the utilization of drying shrinkage inhibitors and wet expansion inhibitors can be useful in controlling certain hydraulic cement/gypsum/latex mixtures.

EXAMPLE NO. 4

The same cement mixture as in Example No. 1 was mixed with water and an acrylic latex, provided by Reichold Chemicals in the same proportions as described above. At one day the cure bar shrank −124 while the wet bar expanded +680. Another cement mixture of the same composition was mixed with a carboxylated styrene butadiene latex emulsion, provided by Reichold Chemicals, mixed with water in the same proportions as above. After one day the dry bar shrank −140 while the wet bar expanded and cracked. This illustrates again the unexpected effects latexes have on the soundness and length changes of such cement mixtures.

EXAMPLE NO. 5

Another cement mixture of the same compositions as Example No. 1 was mixed with styrene butadiene latex emulsions supplied by Polysar and mixed in the same proportions as above. At three days the dry shrinkage was −390. Another cement mixture of the same composition was mixed with an acrylic latex emulsion, supplied by Rohm & Haas in the same proportions as above, resulting in three day shrinkage of −124. This illustrates again the unexpected effects different latex emulsions have on nonPortland hydraulic cement/gypsum cement mixtures as opposed to Portland cement mixtures alone.

While it is apparent that the invention herein disclosed is well calculated to fulfill the objects above stated, it will be appreciated that numerous modifications and embodiments may be devised by those skilled in the art, and it is intended that the appended claims cover all such modifications and embodiments as fall within the true spirit and scope of the present invention.

Having thus described our invention, what we claim as new and desire to secure by Letters Patent is:

1. A method for reducing the wet expansion and drying shrinkage of an aluminous cement which comprises adding thereto:
   (a) gypsum in an amount above about 5 to about 55 percent by weight based on the amount of the aluminous cement to reduce drying shrinkage; and
   (b) a first polymer latex emulsion such that the percent polymer solids based on the amount of the aluminous cement and gypsum is about 1 to 25 percent by weight to reduce wet expansion.

2. The method according to claim 1 wherein the amount of gypsum ranges from about 50 to 40 percent.

3. The method according to claim 1 where the amount of solids of first polymer latex emulsion ranges from 2 to 15 weight percent.

4. The method according to claim 1 which further comprises adding a second polymer latex emulsion such that the percent polymer solids of the second emulsion based on the amount of the aluminous cement and gypsum is about 1 to 25 percent by weight to further reduce drying shrinkage.

5. The method according to claim 4 wherein the amount of solids of the second polymer latex emulsion ranges from about 2 to 15 weight percent.

6. A method for reducing the drying shrinkage of an aluminous cement which comprises adding thereto:
 (a) gypsum in an amount of above about 5 to about 55 percent by weight based on the amount of the aluminous cement to reduce drying shrinkage; and
 (b) a first polymer latex emulsion such that the percent polymer solids based on the amount of the aluminous cement and gypsum is about 1 to 25 percent by weight to further reduce drying shrinkage.

7. The method according to claim 6 wherein the amount of gypsum ranges from about 5 to 40 percent.

8. The method according to claim 6 wherein the amount of solids of the polymer latex emulsion ranges from about 2 to 15 weight percent.

9. The method according to claim 6 which further comprises adding a second polymer latex emulsion such that the percent of solids of the second emulsion based on the amount of the aluminous cement and gypsum is about 1 to 25 percent by weight to reduce wet expansion.

10. The method according to claim 9 wherein the amount of solids of the second polymer emulsion ranges from about 2 to 5 weight percent.

11. A method for reducing the wet expansion of a cementitious composition comprising aluminous cement in an amount of 60 to 95 weight percent and gypsum in an amount of 5 to 40 weight percent, which method comprises adding thereto a first polymer latex emulsion such that the percent polymer solids based on the amount of aluminous cement and gypsum in the cementitious composition is about 1 to 25 weight percent to inhibit wet expansion.

12. The method according to claim 11 wherein the amount of solids of first polymer latex emulsion ranges from about 2 to 15 weight percent.

13. The method according to claim 11 which further comprises adding a lithium salt in an amount of about 0.01 to 0.5 weight percent based on the weight of the cementitious composition.

14. The method according to claim 13 wherein the lithium salt is lithium carbonate, lithium citrate, lithium hydroxide, lithium acetate, or mixtures thereof.

15. The method according to claim 11 which further comprises adding thereto Portland cement in an amount of about 0.1 to 25 percent by weight based on the weight of the cementitious composition to reduce drying shrinkage.

16. The method according to claim 11 which further comprises adding aluminum sulfate in an amount of about 0.1 to 15 percent by weight based on the weight of the cementitious composition to reduce drying shrinkage.

17. The method according to claim 11 which further comprises adding a second polymer latex emulsion such that the percent polymer solids of the second emulsion based on the amount of the aluminous cement and gypsum is about 1 to 25 percent by weight to reduce drying shrinkage.

18. The method according to claim 17 wherein the amount of solids of the second polymer latex emulsion ranges from about 2 to 15 weight percent.

19. A method for reducing the drying shrinkage of a cementitious composition comprising aluminous cement in an amount of about 60 to 95 weight percent and gypsum in an amound of about 5 to 40 weight percent, which method comprises adding a first polymer latex emulsion such that the percent polymer solids based on the amount of aluminous cement and gypsum in the cementitious composition is about 1 to 25 weight percent to reduce the drying shrinkage.

20. The method according to claim 19 wherein the amount of solids of first polymer latex emulsion ranges from about 2 to 15 weight percent.

21. The method according to claim 19 which further comprises adding thereto Portland cement in an amount of about 0.1 to 25 percent by weight based on the weight of the cementitious composition to reduce drying shrinkage.

22. The method according to claim 19 which further comprises adding a lithium salt in an amount of about 0.01 to 0.5 weight percent based on the weight of the cementitious composition.

23. The method according to claim 19 which further comprises adding aluminum sulfate in an amount of about 0.1 to 15 percent by weight based on the weight of the cementitious composition to reduce drying shrinkage.

24. The method according to claim 19 which further comprises adding a second polymer latex emulsion such that the percent polymer solids of the second emulsion based on the amount of hydraulic cement and gypsum is about 1 to 25 percent by weight to reduce drying shrinkage.

25. A method for reducing the wet expansion and drying shrinkage of a cementitious composition comprising aluminous cement which comprises adding thereto:
 (a) gypsum in an amount of about 5 to 40 percent by weight based on the amount of aluminous cement to reduce drying shrinkage; and
 (b) a first polymer latex emulsion such that the percent polymer solids based on the amount of the aluminous cement and gypsum is about 2 to 15 percent by weight to reduce wet expansion.

26. The method according to claim 23 wherein the amount of gypsum ranges from about 10 to 25 percent by weight.

27. The method according to claim 25 which further comprises adding a second polymer latex emulsion such that the percent polymer solids of the second emulsion, based on the amount of aluminous cement and gypsum, is about 2 to 15 percent by weight to further reduce drying shrinkage.

28. The method according to claim 25 wherein the amount of solids of first polymer latex emulsion ranges from about 5 to 10 weight percent.

29. The method according to claim 27 wherein the amount of solids of the second polymer latex emulsion ranges from about 5 to 10 weight percent.

30. The method according to claim 25 which further comprises adding a lithium salt in an amount of about 0.01 to 0.5 weight percent based on the weight of the cementitious composition.

31. The method according to claim 30 wherein the lithium salt is lithium carbonate, lithium citrate, lithium hydroxide, lithium acetate, or mixtures thereof.

32. The method according to claim 25 which further comprises adding thereto Portland cement in an amount of about 1 to 20 percent by weight based on the weight of the cementitious composition to reduce drying shrinkage.

33. The method according to claim 25 which further comprises adding aluminum sulfate in an amount of about 0.1 to 15 percent by weight based on the weight of the cementitious composition to reduce drying shrinkage.

34. A method for reducing the drying shrinkage of an aluminous cement which comprises adding thereto:
   (a) gypsum in an amount of above about 10 to about 25 percent by weight based on the amount of the aluminous cement to reduce drying shrinkage; and
   (b) a polymer latex emulsion such that the percent polymer solids based on the amount of the aluminous cement and gypsum is about 2 to 15 percent by weight to further reduce drying shrinkage.

35. The method according to claim 34 wherein the amount of solids of the polymer latex emulsion ranges from about 5 to 10 weight percent.

* * * * *